(12) United States Patent
Thumparthy

(10) Patent No.: US 11,750,364 B2
(45) Date of Patent: Sep. 5, 2023

(54) FUZZY DATAMATCHING USING HOMOMORPHIC ENCRYPTION

(71) Applicant: Brainlab AG, Munich (DE)

(72) Inventor: Shiva Ashish Thumparthy, Munich (DE)

(73) Assignee: BRAINLAB AG, Munich (DE)

( * ) Notice: Subject to any disclaimer, the term of this patent is extended or adjusted under 35 U.S.C. 154(b) by 0 days.

(21) Appl. No.: 17/286,931

(22) PCT Filed: Mar. 17, 2020

(86) PCT No.: PCT/EP2020/057340
§ 371 (c)(1),
(2) Date: Apr. 20, 2021

(87) PCT Pub. No.: WO2021/185434
PCT Pub. Date: Sep. 23, 2021

(65) Prior Publication Data
US 2022/0094520 A1    Mar. 24, 2022

(51) Int. Cl.
*H04L 29/06* (2006.01)
*H04L 9/00* (2022.01)
(Continued)

(52) U.S. Cl.
CPC .......... *H04L 9/008* (2013.01); *G06F 16/2468* (2019.01); *H04L 9/0618* (2013.01)

(58) Field of Classification Search
CPC .... H04L 9/008; H04L 9/0618; G06F 16/2468
See application file for complete search history.

(56) References Cited

U.S. PATENT DOCUMENTS 8,983,941 B1 * 3/2015 Murphy-Chutorian ..................... G06F 16/583
707/723
2018/0212758 A1 * 7/2018 Williams ............... H04L 9/0861
(Continued)

FOREIGN PATENT DOCUMENTS

CN   107070634 A * 8/2017 ............. H04L 9/008
JP   4850351 B2 * 1/2012

OTHER PUBLICATIONS

European Patent Office: Communication Pursuant to Article 96(3) EPC dated Jan. 31, 2022. 4 pages.
(Continued)

*Primary Examiner* — Joseph P Hirl
*Assistant Examiner* — Leynna Truvan
(74) *Attorney, Agent, or Firm* — Gray Ice Higdon

(57) ABSTRACT

Computer-implemented methods and systems (DMS) for facilitating data similarity queries across a network (CN) of data memories (DM1, DM2). The disclosed methods and system are configured for matching data items held in the data memories (DM1, DM2) in a probabilistic manner with cryptographic protection of the data items. The data matching methods and systems (DMS) are robust against inconsistencies within the data to be matched (such as typographical errors, minor mismatches etc), within a certain predetermined similarity threshold (q), usually described as a percentage. The disclosed methods and systems (DMS) allow fast, low latency turnaround by aggregating the data items to be matched into data structures (M1, M2) that facilitate group-wise matching as opposed to pair-wise matching.

16 Claims, 8 Drawing Sheets

(51) Int. Cl.
　　　G06F 16/2458　　(2019.01)
　　　H04L 9/06　　　(2006.01)

(56) References Cited

U.S. PATENT DOCUMENTS

2018/0337899 A1* 11/2018 Becker .................... H04L 9/008
2019/0245679 A1* 8/2019 Suresh ..................... G09C 1/00

OTHER PUBLICATIONS

Cruz et al., "Secure similarity joins using fully hmomorphic encryption" IIWAS '17: Proceedings of the 19th International Conference on Information Integration and Web-Based Applications & Services. XP058386013 Dec. 2017. pp. 224-233.

Hardy et al., "Private federated learning on vertically partitioned data via entity resolution and additively homomorphic encryption", ARXIV.org, Cornell University Library, Section 4. XP080841139. Nov. 29, 2017 pp. 6-8.

Xin et al., "FHSM: Factored Hybrid Similarity Methods for Top-N Recommender Systems", Big Data Analytics in the Social and Ubiquitous Context: 5th International Workshop on Modeling Social Media, MSM 2014, 5th International Workshop on Mining Ubiquitous and Social Environments, Muse 2014 and First Internatioanl Workshop on Machine Le, XP047354160, ISBN: 978-3-642-17318-9. Sections 3 &4. pp. 99-101. Sep. 18, 2016.

Duong et al.: "Efficient secure matrix multiplication over LWE based homomorphic encryption", Tatra Mountains Mathematical Publications 67.1. 15 pages. Feb. 5, 2020.

Vatsalan, Dinusha et al : "Privacy preserving matching of similar patients"; Journal of biomedical informatics 59. 7 pages.Aug. 10, 2015.

International Search Report and Written Opinion issued for Application No. PCT/EP2020/057340 dated Nov. 17, 2020.

Randall, Sean M et al.: "Privacy preserving record linkage using homomorphic encryption", Population Informatics for Big Data, Sydney, Australia. 2016.

* cited by examiner

FUZZY DATAMATCHING USING HOMOMORPHIC ENCRYPTION

FIELD OF THE INVENTION

The present invention relates to computer-implemented methods for facilitating a data similarity query across a network of data memories, systems for facilitating a data similarity query across a network of data memories, corresponding computer programs, non-transitory program storage media storing such programs, and computing devices or systems for executing the programs, as well as respective systems comprising one or more electronic data storage devices and the aforementioned computing devices.

TECHNICAL BACKGROUND

If there is one resource in today's world of which there is no shortage of it is data. Network-interconnected devices generate about 2.5 quintillion bytes of data per day according to a June 2013 New York Times report ("*How the U.S. Uses Technology to Mine More Data More Quickly*"). This is probably a hopeless underestimate for 2020 as that amount has risen largely since. And this data amount is set to rise even more as communication infrastructures are being updated in many counties for high performance networks such as 5G, ready for the internet of things (ioT), connecting even more players, 10s of billions of devices, with round the clock data dissemination.

Managing this glut of data is no mean feat. Already today, data centres around the world consume energy at an estimated 200 TWh (Terawatt hours) each year as has been reported for example in *Nature*, vol 561, pp 163-166, 12 Sep. 2018.

Managing resources to process this data is a challenge. Pertinent technical tasks to gain more relevance include shielding devices from malware, managing network data traffic, low latency information retrieval, and optimizing data storage and more.

Capacity optimization includes technologies to improve storage capacities across network data memories for instance. Data compression can be used or data reduplication. Data reduplication is useful because data is not always cumulative but includes certain redundancies which one may wish to identify through matching operations, and then remove to improve data capacity. Similar data matching techniques can be used for bandwidth optimization in data exchange across networks.

Some of the data is personal data. For example, the data to be processed may relate to confidential information which the data owner does not wish to divulge to other parties. In many jurisdictions, privacy protection laws are in place to safeguard data owner rights.

The requirement to respect privacy of data owners makes management of data processing infrastructures even more challenging. Because of privacy safeguards, storage and network capacity optimization, especially through third parties, are of concern.

Whilst cryptographic techniques exist to encrypt sensitive data, technologies that scan data for information such as data matching operations cannot be used as such because encrypted data is usually unsuitably for such data processing.

Homomorphic encryption techniques emerged that support processing directly on encrypted data. However, it has been found that using such homomorphic encryption schemes may add additional computational overheads which could lead to prohibitively low turnaround times.

There may therefore be a need for improved handling of encrypted data.

The present invention can be used for any data processing of encrypted data that relies on robust data matching operations.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION OF THE INVENTION

In the following, a short description of the specific features of the present invention is given which shall not be understood to limit the invention only to the features or a combination of the features described in this section.

The disclosed methods and system are configured for matching data items held in data memories across a network, in a probabilistic manner with cryptographic protection of the data items. The data matching methods and systems are robust against inconsistencies within the data to be matched (such as typographical errors, minor mismatches etc), within a certain predetermined similarity threshold, usually described as a percentage. The disclosed methods and system allows fast, low latency turnaround by aggregating the data items to be matched into data structures that facilitate group-wise matching as opposed to pair-wise matching.

The methods as system may be used to match patient records, including for example demographic records, genetic data such as genomic sequence data, medical image data such as CT imagery etc., across or within medical facilities. However, the proposed systems and methods are not limited to the medical field any may be applied in a host of other technical applications such as data network traffic management, malware detection, distributed information retrieval, network capacity optimization, etc.

GENERAL DESCRIPTION OF THE INVENTION

In this section, a description of the general features of the present invention is given for example by referring to possible embodiments of the invention.

In general, the invention addresses the aforementioned needs by providing, in a first aspect, a computer-implemented cryptographic method for facilitating a data similarity query across a network of data memories, the method comprising:

a) receiving, from a first memory in a network, a first ciphertext for a first aggregation of first encodings of data items of a first group;

b) receiving, from a second memory in the network, a second ciphertext for a second aggregation of at least one second encoding of at least one data item of a second group;

c) processing the first and second ciphertexts into a third ciphertext, decryptable into plaintext output, the said plaintext output indicative of, or convertible into, similarity measures between data items from the two groups.

Instead of operating pair-wise, the proposed method operates group-wise to achieve high throughput, low latency, and efficient in-memory representation in the computing entity that executes the method. Preferably the computing entities, a computing device such as a server or other, include processor(s) of multicore design or other architectures that allow parallel executions and implementation, such as GPUs, or others.

The aggregations of the first and second encodings are respective data structures that support efficient processing with low communication overhead. The aggregations allow addressing the whole of the respective first and second encodings as respective single entities. The aggregations are the results of aggregating the encodings into said data structures. Matrices are one example of such aggregations.

The data similarity query is a matching operation. Similarity queries mainly envisaged herein are membership queries, that is, queries as to whether one or more data items from the first group are sufficiently similar to one or more data items of the second group.

The method comprises executing, on at least one processor of at least one computing device, the following exemplary steps which are executed by the at least one processor.

In an example of the method according to the first aspect, the first encodings and/or the second encoding are binary encodings.

In an example of the method according to the first aspect the first and/or the second encoding is by representation in at least one probabilistic data structure, PDS.

In an example of the method according to the first aspect, the said PDS includes any one or more of: a bloom filter, Cuckoo filter, quotient filter, Morton filter, or XOR filter.

In an example of the method according to the first aspect, the first and second aggregations previously obtained by forming respective matrices, from the said first encodings and the at least one second encoding.

In an example of the method according to the first aspect, the at least the first aggregation is formed by incorporating the first encodings into rows or columns of a respective matrix.

In an example of the method according to the first aspect, the processing c) includes a matrix multiplication of the at least two matrices.

In an example of the method according to the first aspect, the processing c) is implemented in a single-instruction-multiple-data, SIMD, set up.

In an example of the method according to the first aspect the said plaintext output is represented as, or is convertible into, a matrix.

In an example of the method according to the first aspect, the first and second ciphertexts previously obtained by a respective homomorphic encryption operation. Preferably, the homomorphic encryption operation supports plaintext linear combination operations, including dot-products or matrix multiplication.

In an example of the method according to the first aspect, the method comprises decrypting the third ciphertext into plaintext output.

In an example of the method according to the first aspect, the plaintext output represents a partial similarity measure that is convertible into the said (full) similarity measures In an example of the method according to the first aspect, the similarity measures, or the partial similarity measure, is based on any one of, but is not limited to: Dice coefficient measure, Tversky coefficient measure, Jaccard coefficient measure. Depending on the similarity measure used, more or less additional information may need to be leaked. This is in particular the case for the Dice or Jaccard coefficient measure. Since homomorphic encryption does in general not support division, two result ciphertexts may have to be released for decryption, instead of only one (the third ciphertext as produced in processing step c)). The results may then need to decrypted and divided in plaintext. The system based on the Tversky index measure as preferably envisaged herein will only need to provide the said third ciphertext in embodiments, which allows revealing the similarity estimate on decryption in some embodiments.

In an example of the method according to the first aspect, the method comprises converting the said plaintext output into the said similarity measures.

In some embodiments, similarity measures are used, such as the mentioned Dice or Tversky measures or other similarity measures. Preferably, and as envisaged herein the similarity measures are based on discrete counts in set unions and set intersections. The union and intersection counts are obtained by aligning and comparing the encodings. The plaint text output facilitates computing such similarity measures. Specifically, and in embodiments, the plaintext output, or the third ciphertext, represent a partial similarity measure such as the intersection counts. In embodiments, the plaintext output, or the third ciphertext form intermediate data. In the conversion, the intermediate data which is combined with auxiliary data, such as the union counts, to reveal the similarity measures in full. In embodiments, the conversion includes forming a linear combination of the partial measures (the intersection counts) and the auxiliary data (the union counts). The linear combination may be based on a similarity threshold associated with the similarity measure. The threshold represents the lower limit for the similarity of data items to be classified as a match or a mismatch. It is typically expressed as a percentage for example a similarity threshold of 80% means that data items need to be at least 80% similar to be classified as a match.

In an example of the method according to the first aspect, the first and/or second ciphertexts are previously obtained by a packing operation followed by the homomorphic encryption operation.

A packing operation refers to a pre-processing that enables encryption of multiple values into one ciphertext, for the purposes of SIMD operations. In embodiments, packing includes representing the aggregated data structure (such as a matrix) as a polynomial.

In a further aspect there is provided a method for facilitating a data similarity query across a network of data memories, the method comprising:

a) forming i) a first aggregation from first encodings of data items of a first group in a first memory, and ii) a second aggregation from at least one second encoding of at least one data item of a second group in a second memory; and b) homomorphically encrypting the two aggregations into two ciphertexts.

Preferably, the homomorphically encrypting b) of the two aggregations results in two respective single such ciphertexts, that is, a single ciphertext for each aggregation. This allows and facilitates more efficient processing and low communication overhead. The above mentioned packing operation facilitates such encryption into the respective single ciphertexts.

In a further aspect there is provided a method for facilitating a data similarity query across a network of data memories, the method comprising decrypting a third ciphertext, previously obtained by processing first and second ciphertexts, into plaintext output convertible into similarity measures for the data items across the groups, the first ciphertext previously obtained through homomorphic encryption of a first aggregation of first encodings of data items of a first group in a first memory, and the second ciphertext previously obtained through homomorphic encryption of a second aggregation of a second encoding of at least one data item of a second group in a first memory.

In a further aspect there is provided a system for facilitating a data similarity query across a network of data memories, configured to:
a) receive, from a first memory in a network, a first ciphertext for a first aggregation of first encodings of data items of a first group;
b) receive, from a second memory in the network, a second ciphertext for a second aggregation of at least one second encoding of at least one data item of a second group; and to
c) process the first and second ciphertexts into a third ciphertext, decryptable into plaintext output, the said plaintext output indicative of, or convertible into, similarities between data items from the two groups.

In a further aspect there is provided a system for facilitating a data similarity query across a network of data memories, configured to:
a) form i) a first aggregation from first encodings of data items of a first group in a first memory, and ii) a second aggregation from at least one second encoding of at least one data item of a second group in a second memory; and to
b) homomorphically encrypt the two aggregations into two ciphertexts.

In a further aspect there is provided a system for facilitating a data similarity query across a network of data memories, configured to:
decrypt a third ciphertext, previously obtained by processing first and second ciphertexts, into plaintext output convertible into similarity measures for the data items across the groups, the first ciphertext previously obtained through homomorphic encryption of a first aggregation of first encodings of data items of a first group in a first memory, and the second ciphertext previously obtained through homomorphic encryption of a second aggregation of a second encoding of at least one data item of a second group in a second memory.

As mentioned above, and according to some examples of the proposed methods and system, Bloom filters are used to encode the data items, such as records, such that the encodings are resilient to typographical errors. Bloom filter encodings (preferably one per record) are then aggregated, "stacked" on top of each other, to generate a Bloom filter matrix as one example of the aggregated data structure. This matrix is then homomorphically encrypted into a single ciphertext, as opposed to a ciphertext per Bloom filter. This allows for group-wise, that is, batch comparisons of data items, with quadratic reduction of communication overheads and computational complexity.

The proposed systems and methods disclosed herein allow the efficient handling of encrypted data for data matching across data memories in networks, whilst being robust against variation in the data. Data matches such as duplicates can be identified despite certain variations within a defined similarity threshold. The proposed system can be used in all kinds of data processing applications, which is not limited to textual data, but may also include image processing application, network and data storage management, and others. One application is in the medical field. The medical field is a sizable data generator, with patient data ever increasing, in the face of a growing and ailing population. Medical data includes patient records, written reports, image data, and measurements collected from medical sensors from IoT medical devices, such as bio-data generated by smart phones, fitness trackers, and other wearables. This surge in medical data needs to be stored and managed. Sometimes a patient' medical data is held at different facilities, one facility not knowing about pertinent held at another, not least because of privacy laws where clinical facilities are barred from divulging data without authorisation. Being able to find medical data from one data originator, namely a single patient, held in multiple hospitals or medical or non-medical facilities, possibly geographically distributed, nationally or even internationally, may be conducive for building up an accurate picture of the patient's medical state and history.

In another aspect, the invention is directed to a computer program which, when running on at least one processor (for example, a processor) of at least one computer (for example, a computer) or when loaded into at least one memory (for example, a memory) of at least one computer (for example, a computer), causes the at least one computer to perform any one of the the above-described methods. The invention may alternatively or additionally relate to a (physical, for example electrical, for example technically generated) signal wave, for example a digital signal wave, carrying information which represents the program, for example the aforementioned program, which for example comprises code means which are adapted to perform any or all of the steps of the method according to the first aspect. A computer program stored on a disc is a data file, and when the file is read out and transmitted it becomes a data stream for example in the form of a (physical, for example electrical, for example technically generated) signal. The signal can be implemented as the signal wave which is described herein. For example, the signal, for example the signal wave is constituted to be transmitted via a computer network, for example LAN, WLAN, WAN, for example the internet. The invention according to the second aspect therefore may alternatively or additionally relate to a data stream representative of the aforementioned program.

In a further aspect, the invention is directed to a non-transitory computer-readable program storage medium on which the computer program according to the previous aspect is stored.

In a further aspect, the invention is directed to at least one computing device (for example, a computer), comprising at least one processor (for example, a processor) and at least one memory (for example, a memory), wherein the computer program is running on the processor or is loaded into the memory, or wherein the at least one computer comprises the computer-readable program storage medium.

Definitions

Systems and methods as proposed herein operate in plaintext domain and/or ciphertext domain, or partly in both.

"Encryption" is a cryptographic mapping of plaintext in plaintext domain to ciphertext in ciphertext domain, denoted as x (a plaintext)→{x} (x's ciphertext). The result of an encryption is ciphertext.

"Decryption" is the reversal of encryption. Decryption is a cryptographic mapping of a ciphertext in ciphertext domain to plaintext in plaintext domain. The result of a decryption is plaintext. Plaintext is recoverable from its ciphertext by decryption only in combination with additional information, referred to herein as a "key(s)". Without knowledge of the key(s), encryption is not practicable in finite time with finite computational resources. The probability for accomplishing the said reversal without keys is arbitrarily small. If x is a plaintext, {x} denotes its ciphertext.

"Ciphertext" does not divulge information content of plaintext. The following notation is used herein: "{M}" is the ciphertext of plain text "M". In other words, curly brackets indicate encrypted matter.

"Encoding" is the result of an operation of an encoder. An encoder (also referred to herein as "filter") is a computational entity that maps plaintext to a combination of (one or more) characters of a pre-defined set, an "alphabet". The combination is an encoding for a certain data input. Binary encoders are one of the examples used herein, where the alphabet comprises only two characters, commonly referred to as binary "0" and "1". An encoding is not an encryption.

"Probabilistic data structure(s)" ("PDS") is a data structure to represent or facilitate an encoding and are envisaged herein in some embodiments. Bloom filters are an example of PDS. Some PDS use hash functions or others to compactly represent a group or set of data items as a digest. PDS supports operations, such as membership querying or others, in approximation, that is, the results are "true" with a certain probability and/or error bounds are known in relation to the results.

"Memory" as used herein include a memory portion of the same memory system, or may relates to different memories in different system, possibly remote from each other.

"Network" includes "internal" networks where the two memories are not necessarily remote ("external network") from each other.

"Matrix" is a data structure that requires at least 2D (2-dimensional) addresses to access its entries. The said addresses may also be referred to herein as "index/indices". Matrices of dimension n higher than 2, "tensors", are also envisaged herein wherein the required addresses are then n(>2)-dimensional. A 2D matrix has "size" of "n×m", with n,m being natural numbers. n,m pertain to rows and columns into which entries are organized in the 2D case. "$m_{ij}$" is shorthand for an entry in a 2D matrix M, whilst $m_{ijk}$ is shorthand for a 3D matrix M ("tensor"), and so on. A "vector" is a special case of a matrix where at least one of n or m is unity.

"Matrix multiplication", denoted herein as "*", is an operation, or mapping, that turns an "n×m"-matrix and an "m×P"-matrix into an "n×P"-matrix.

"Transposition" is another matrix operation that turns an "n×m"-matrix into an "m×n"-matrix.

"transposed" is either an act to accomplish a transposition or it refers to a state where two matrices are transposed relative to each other. The two matrices may be natively transposed without an explicit transposition operation if the two matrices have been so generated. Two matrices may be natively transposed relatively to each other if, given first and second data, the first data is arranged in rows (columns) in one matrix and second data is arranged in columns (rows) in the other matrix.

"1D", "2D", "3D" "nD" is shorthand for n-dimensional, n=1, 2, 3, . . . , and relates to data arrangement.

A "computer-implemented method" as the term is used herein incudes that all steps or, merely some of the steps (i.e. less than the total number of steps), of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or output by the computer. The computer is preferably operatively coupled to a display device which allows information out by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a program which, when running on a computer, causes the computer to perform one or more or all of the method steps described herein and/or to a program storage medium on which the program is stored (in particular in a non-transitory form) and/or to a computer comprising said program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for output guidance information. The guidance information can be output, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures, which are not to scale, wherein.

DESCRIPTION OF EMBODIMENTS

Figure 1:
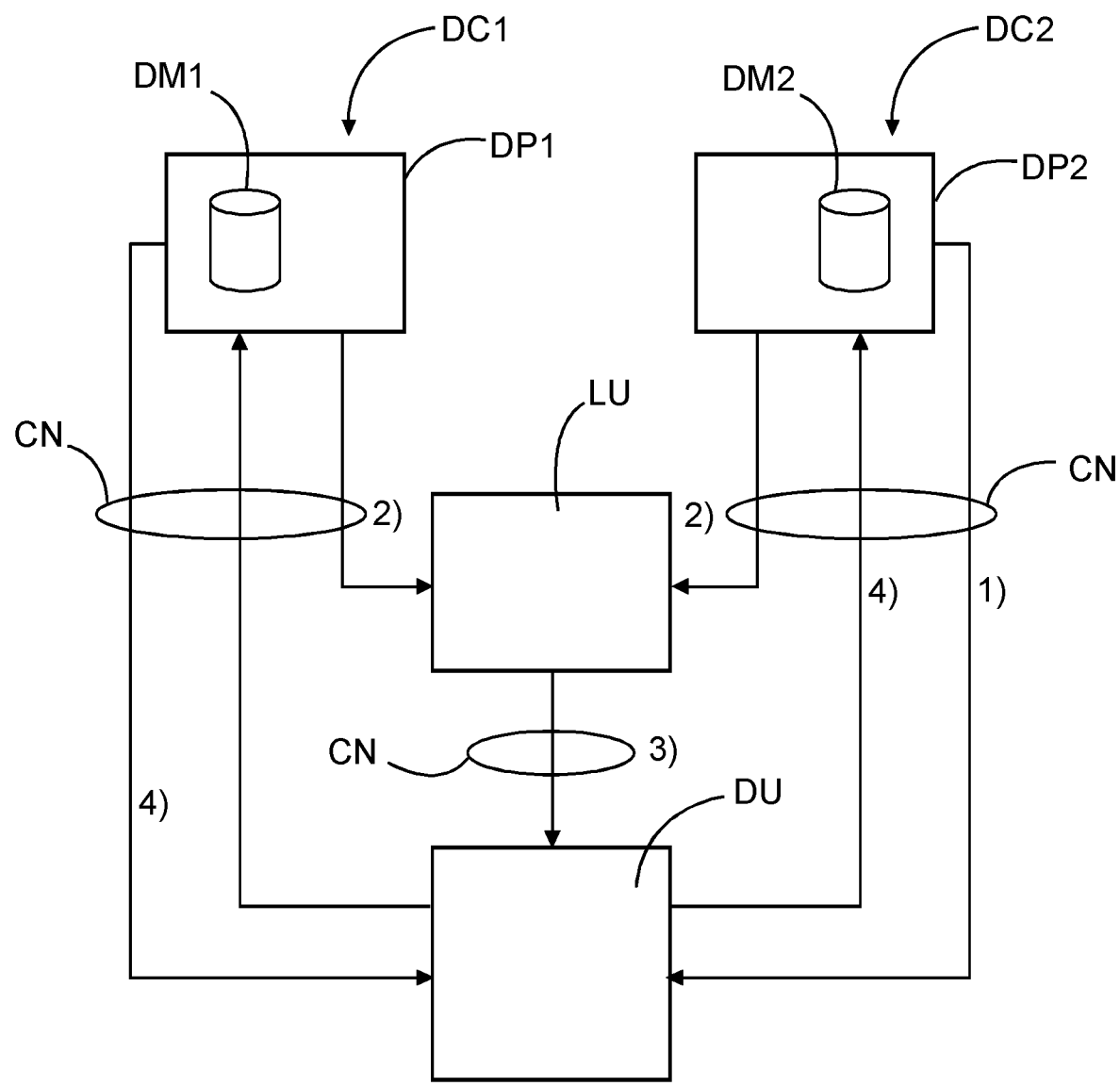
FIG. 1 illustrates a schematic block diagram of a communication network with data memory nodes according to a first embodiment.

Reference is made first to the block diagram of FIG. 1 which shows schematically a system DMS which may include a network of computing nodes. The nodes are arranged as computing devices. The nodes are connected by way of a communication network CN. The communication network CN may be wired, wireless or both in parts. The nodes may be located geographically remote from each other but geographical remoteness is not a necessity herein as will become apparent below. In one example the communication network CN is configured to implemented the internet protocol suite TCP/IP and cognates, but this is not at the exclusion of other network types and protocols.

The network includes data custodians DC1, DC2. Only two are shown with the understanding that there may be three or more. Data custodians DC1, DC2 include respective data memory systems DM1, DM2. The data memories DM1 and DM2 hold data. The data comprises data items of all kinds envisaged herein including structured or unstructured data. The data comprises data items. The data items may be text, numeric, or alphanumeric. Data items may further include, or include instead, video, audio or a combination of any of the foregoing (multi-media). The data times may be organized in data files or form parts thereof.

The data memory systems DM1 and DM2 may be arranged as databases but, as said, this is not requirement. In databases the data items are sometimes arranged in records each comprising plural fields representing different attributes. Patient records in medical database systems such in a HIS (Hospital Information System) or PACS (picture archiving and communication system) are examples envisaged herein among many others such as packet traffic management systems for network switches or routers, malware databases, etc. "Data items" as used herein may be refer to data in each of the fields having the attributes, or may relate to respective data records as a whole.

Data custodians systems DC1, DC2 include respective data processing systems DP1, DP2 that allow to process, manipulate, retrieve, etc the data items in the their respective data memories DM1, DM2.

Data processing systems DP1, DP2 include respective one or more processors (not shown). The processors include a central processing unit CPU (not shown) in communication with a main or primary memory. During computational operation of the data processing systems DP1, DP2, data items and instructions can be loaded to process the data items held in data memory DM1, DM2. Memories DM1, DM2 may be arranged as secondary storages from which data items can be loaded into the main memory or primary memory as controlled by the respective CPUs of data processing systems DP1, DP2.

The proposed network supports anonymised data matching where data, as held by one the data custodian, say DC1, can be queried against data held by the other data custodian DC2. The said data querying includes matching data across the two nodes DC1, DC2. The matching operation mainly envisaged herein is thus one for membership, but other types of queries and not excluded herein. An exact matching, that is an identity operation, although not excluded herein, is not envisaged in the main. What is envisaged herein in preferred embodiments is fuzzy matching based on a similarity measure. In other words, the result of the querying or matching operation is an indication as to whether there is a match across data items held by the data custodians DC1, DC2 within a predefined similarity score or threshold $q=q_1/q_2$. In this fraction, which is assumed irreducible, $q_1$ will be referred to herein as the (threshold) numerator, and $q_2$ will be referred to herein as the (threshold) denominator. The threshold quantifies the probability q % for a match. The sum $q_1+q_2$ may be referred to herein as the "threshold sum".

As will be explored in more detail below, the querying operation is anonymised so as not to divulge the data from one custodian to the other, or indeed to any other third party. Operation of the network is hence based on cryptographic protocols to ensure privacy of data is preserved. In addition to preserving-privacy of data, in preferred embodiments the networks use probabilistic data matching that is robust against inconsistencies within data within a certain predetermined similarity threshold q, usually described as a percentage.

Similarity measure based data matching, or fuzzy matching, is useful in information retrieval applications but also storage optimization to ascertain the extent of duplicate data or data sufficiently similar, the detection of malicious files, malware detection, caching, distributed searches, routing, forensic file systems or others.

The embodiment of the network of nodes in FIG. 1 is arranged as one with two third parties, a linkage unit LU (or "linker"), and a decryption unit DU (or "decryptor"), although this is not necessary, and alternative embodiments are equally envisaged herein, where no or only a single third party is used. In the FIG. 1 embodiment, the fuzzy matching operation is administered in parts by the linker LU, in concert with decryption unit DU. One or both of the computational nodes linker LU and decryptor DU preferably include one or more processors capable of SIMD ("single instruction multiple data") and/or parallel data processing, such as those with multi-core design. GPUs may be used in embodiments as processors in the linker LU and/or the decryptor DU. The data custodians DC1, DC2 suitably prepare the data items to be matched by encoding, aggregation and encryption as will be explored more fully below. The so prepared data is then passed on to linker LU and decryptor DU. The linker LU and the decryptor DU processed the prepared data to produce an end result SR. The end result SR includes indications of match results. The end results are forwarded to either one or both of the data custodians DC1, DC2. The results SR are provided in plaintext by decryptor DU or are provided in ciphertext decryptable by one or both custodians DC1 and DC2).

The decryption unit DU and the linkage unit LU constitute in some embodiments additional nodes (third parties) in the network. But this is not a requirement as the functionalities of the linkage unit LU and the decryption unit may be implemented by one of the custodians DC1, DC2, without third parties. In embodiments, the system DMS supports data linkage operations across the data as held by the two data custodians DC1, DC2 to match and so "link up" related data items that are sufficiently similar within the similarity measure used. The proposed system is configured for fast, low latency matching in a privacy preserving manner, with reduced memory and/or network overhead.

In more detail, the fuzzy matching operation is based on homomorphic encryption algorithms. Advantageously, as proposed herein, the fuzzy matching operation is executed by either of the data custodians, the linkage unit LU and/or the decryption unit DU in an SIMD set-up. The fuzzy matching operation is preferably executed by processors of the data custodian DC1, DC2, the linker unit LU and/or the decryption unit DU configured for parallel computing. Multithreading with dynamic scheduling may also be employed by the processors o. As will be explained more fully below, the data to be matched is represented in efficient data structures that support execution of the fuzzy matching operation in a parallelized and/or SIMD manner. In SIMD setups, and related ones, the efficient data structure allows processing multiple data items aggregated in the data structure with a single instruction. The data structure may be loaded as a whole into the main memory or at least into virtualized memory of the respective processor in the respective computational entity (such as either one of the data custodians, the linker LU and/or the decryption unit DU). Furthermore, a single instruction to process the data structure is loaded into main memory to execute at least a part of the fuzzy matching operation. This allows efficient execution in main memory of the data matching.

The efficient data structures are achieved by judicious aggregation of data items at the respective data custodians DC1, DC2 as will be explained more fully below. In one embodiment, matrix representation is used. The fuzzy matching operation is partly or entirely administered by either one of the data custodians, or the linker LU and/or partly by one or more other third parties such as the decryption unit DU. One application envisaged herein is matching patient records across medical facilities. Because of the similarities based approach, the matching is robust against variations (within threshold q) in data items that relate to the same patient. This allows better memory management and may also support applications such as data analytics to better understand patient populations etc. Whilst processing patients' data is one embodiment envisaged herein, numerous other embodiments in network routing, forensic file systems, detection of malware, etc, as explained above are all envisaged herein, and so are all other applications which benefit from anonymised fuzzy matching of data held in a distributive manner across nodes in a computer network.

In the proposed system, because of representation of the data items in the said aggregated data structure, the data items can be matched for similarity in encrypted form group-wise rather than pair-wise separately. Whilst matching only one data item from one of the data custodians against plural data items of the other custodian is contemplated in the proposed framework, it is when plural items from one data custodian are matched against plural data items in the other custodian that the advantages of the proposed system are most palpable. So rather than matching the two sets of data items from the two data custodians in a pair-wise fashion, which would attract a complexity in the order of $O(N^2)$ (N being the number of data items), the proposed processing proceeds matching group-wise a plurality of data items against the other plurality of data items held in the other data custodian at once. While the groupwise matching approach retains the same time complexity of $O(N^2)$, there is a large hidden constant factor, namely the size of the aggregations, that contributes heavily to reduction of computational overheads. More specifically, the new complexity of the algorithm to the order of $O(N^2/C^2)$, where quantity C is the constant block size that the data items are aggregated into. In the best case, N=C, resulting in exponential reduce in complexity, as only a single homomorphic operation is required. The proposed approach reduces the number of homomorphic operations necessary in comparison to Cruz et al. (cited infra), thereby also reducing the number of resulting ciphertexts from $N^2$ to $(N/C)^2$.

With continued reference to FIG. 1, operation of the system is now explained in more detail. The proposed system uses homomorphic encryption schemes, preferably of the asymmetric type.

In operation, one or both data custodians DC1, DC2 who wish to have their data matched request(s) (1) public encryption keys from the decryption unit DU makes.

Data processors DP1, DP2 of the data custodians DC1, DC2 process respective pluralities of data items to encode same into encodings. Binary encoding schemes are mainly envisaged herein, but so are others. Each data processor DP1, DP2 then aggregates the respective encodings into respective data structures such as matrices as will be described more fully below. The respective aggregations so formed are then encrypted by the data processors DP1, DP2 using the homomorphic encryption scheme. The two aggregates are respectively encrypted into respective single cipher-texts which are then sent (2) to the linkage unit LU. Optionally, and as will be explained in more detail below at FIGS. 5-6 the data custodians make available additional data (referred to herein as auxiliary data) that may facilitate the computation of the matching results.

The linkage unit LU then processes the two cipher-texts into a third single cipher-text by combining the two cipher-texts. As the encryption operation is homomorphic, this combination is respected by the applied encryption. This third cipher-text is then sent (3) to the decryption unit DU where it is decrypted to yield an intermediate plaintext structure.

A new output data structure, referred herein as the output data structure, may then be converted from the said intermediate plain text structure based on certain auxiliary information. The new output data structure SR (see FIGS. 5-7) is indicative of final results, that is, of the matches among data items from the two groups as held at the two data custodians DC1,DC2.

The anonymized computation of similarity measures between the data items from the two groups is partly performed by the linker unit LU and in another part, a complimentary part, by the decryption unit DU. More particularly, the combination by linker LU of the two ciphertexts into the third ciphertext constitutes a part of the similarity measure computation, whilst the remaining part of the similarity computation is done at the decryption unit DU, where the output data structure SR, that represents the similarity match results, is converted from the auxiliary information and the intermediate plaintext structure.

Preferably, this output data structure SR merely reveals whether or not there is a match between any two data items. However, the similarity level of the match is preferably not revealed, and neither is the identity of the matching data items to any party. The output data structure that indicates the matches may be sent (4) in particular to either one or both data custodians to inform about the matches found. Because a given custodian DC1 knowns in which order the data items were aggregated initially by the given custodian DC1, the identity of the matching data items held by the given custodian DC1 can be readily established from the output data structure by look-up at the given custodian DC1, without the given custodian DC1, nor the linker LU or the decryption unit DU, ever having actually accessed the data as held by the other custodian DC2. It is hence best to maintain the original order of the encodings in the aggregated data structure during the matching operation.

For example, with the proposed system DMS, it can be established whether a data item is malicious, or whether a network router node should intercept hostile traffic if a match is found, or whether patients of a medical facility DC1 have medical records at other facilities DC2, etc.

Figure 2:
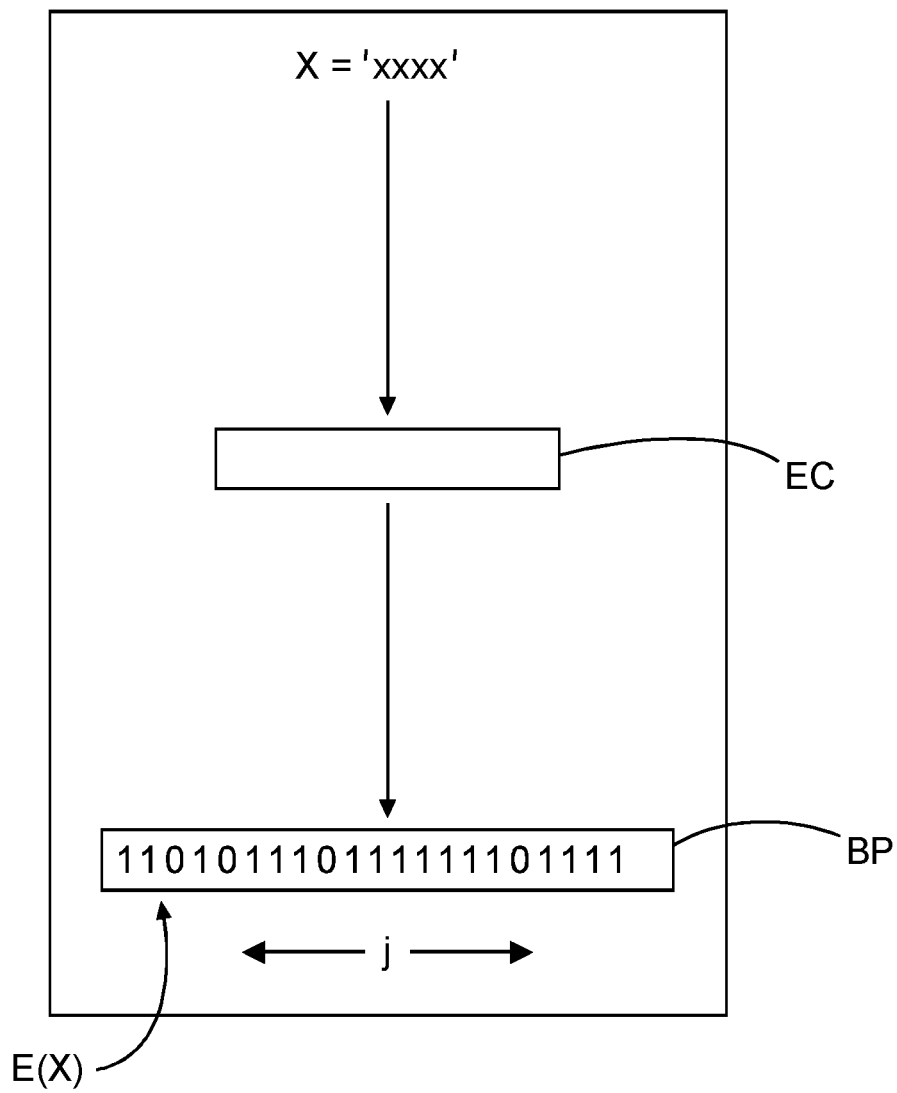
FIG. 2 illustrates a schematic block diagram of a data encoder.
Figure 3:
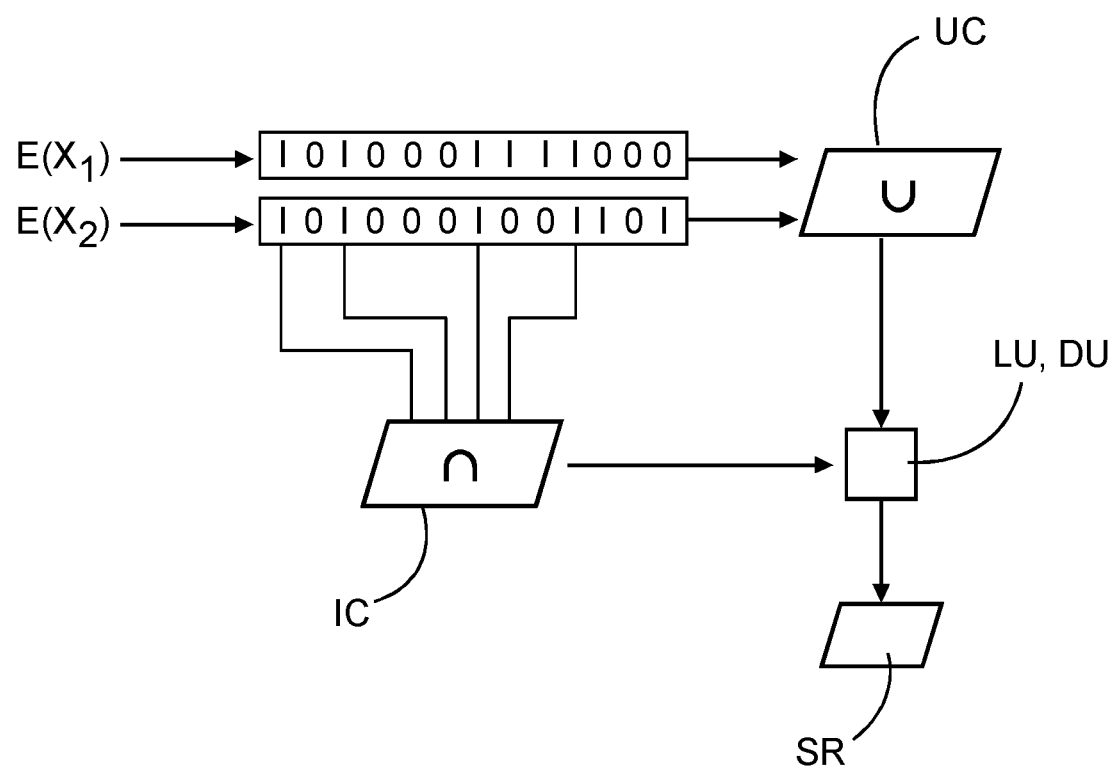
FIG. 3 illustrates a schematic block diagram of a similarity computation based on a binary encoding.
Figure 4:
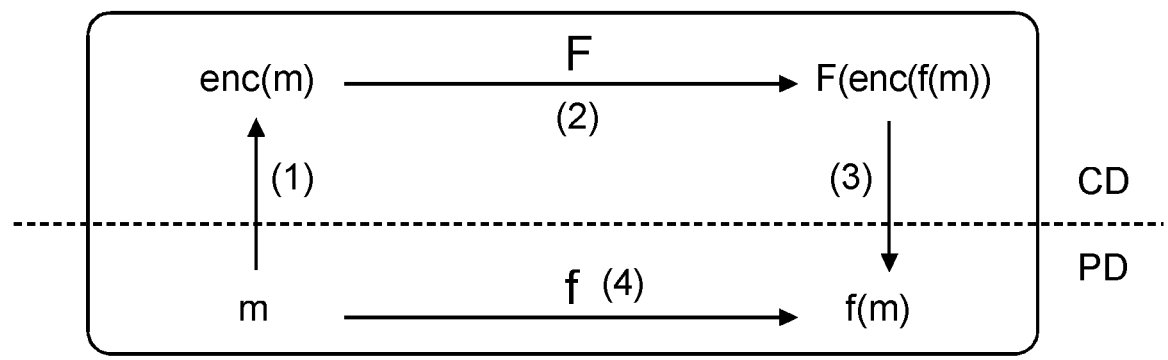
FIG. 4 illustrates a diagram of a homomorphic encryption operation.
Figure 5:
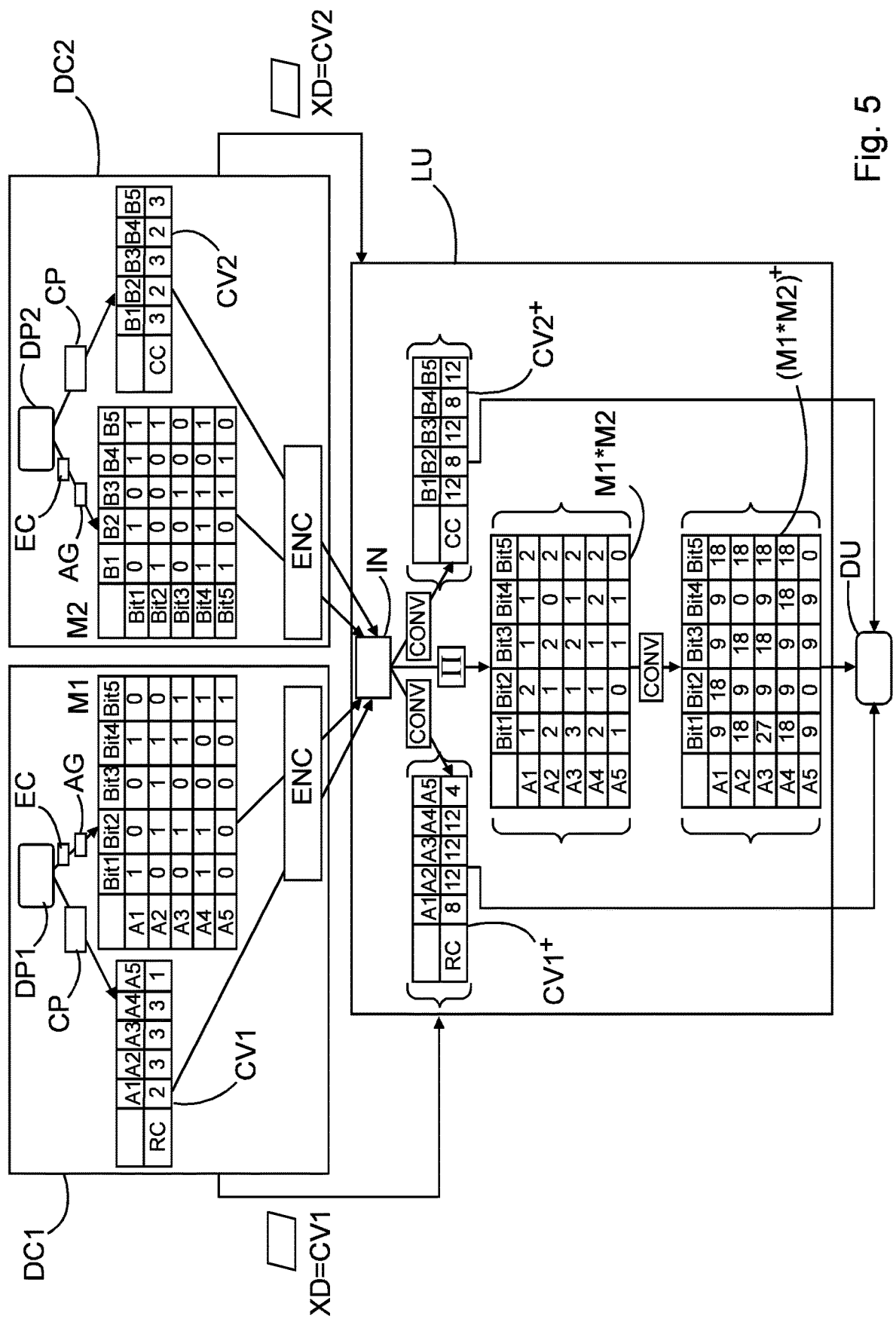
FIG. 5 illustrates a components of the network in FIG. 1 in more detail and according to one embodiment.
Figure 6:
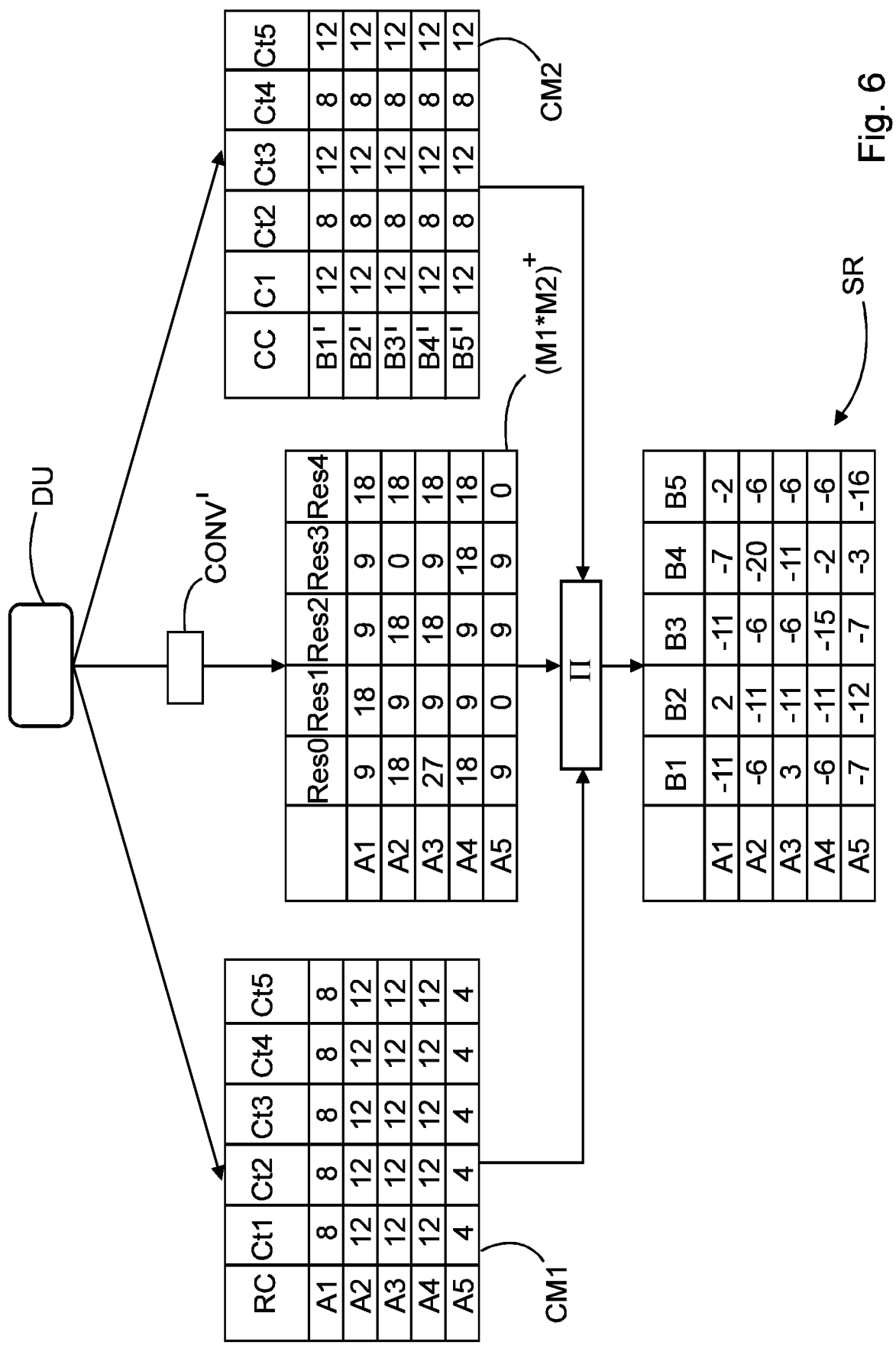
FIG. 6 illustrates a further component of the network in FIG. 1 in more detail and according to one embodiment.

Before explaining operation of the system in more detail at FIGS. 5,6, reference is first made to FIGS. 2-4, in order to explain certain computational primitives for encoding, similarity measurements and encryption that may be used in the data matching system DMS proposed herein.

Turning now first to FIG. 2, this shows a block diagram of an encoder EC as may be used by data custodians DC1, DC2 to encode their data items before encryption and matching. Preferably, the respective encoder EC uses the same encoding algorithm for both data custodians.

In general, the encoder EC transforms an input data item X="xxxx" and represents it as a combination E(X) of elements of an alphabet AL. In binary embodiments of encoder EC, the alphabet AL includes only two elements AL=[a,b]. Without loss of generality, one can assume that a="1" and b="0".

Preferably, for efficiency of processing and better memory representation, the encoder is configured to map input data X onto a fixed length bit pattern of 0's and 1's. The length N is pre-set and may depend to the length and/or number of data items to be matched. In other words, each $E(X) \in [1,0]^N$.

An example of a (linear) bit pattern E=(X)=BP is schematically shown in the bottom portion of FIG. 2 with index j indicating the bit position. Higher dimensional input data such as imagery is also envisaged where the bit pattern is not linear but has a 2D matrix layout. Preferably, the encoder EC has the property that its output, that is the bit patterns BP which represent the encodings of data items X, is uniformly distributed over input X. One option, but not the only option, to achieve this is to use one or more hash functions that operate on the input X. It is the hash values that are then mapped into the bit pattern. Suitable hash functions, or hash function types include a combination of any two or more hash functions chosen from the SHA family of hashes (SHA256, SHA512), the MD family of hashes (MD5, MD6) or other random hash functions.

More particularly, and as envisaged herein in embodiments, bloom filters ("BF") or other probabilistic data structures (PDS) are used herein as encoder EC. In bloom filters, and similar binary encoders, it may be necessary to pre-process the input X if this is a string, for instance, before encoding. In this embodiment and similar embodiments, the input string X is first subjected to an n-gram analysis to be broken down into a system of n-grams, a collection of sub-strings of length smaller than the length of the original string X. The concept of BF has been extended to be also applicable to numerical data. So X can be a string (such as a name of a patient), a numeral, or alphanumeric as mentioned earlier. The encoding operations at both custodians DC1, DC2 are preferably based on the same probabilistic data structure, with the same hash functions and the same encoding length of encoded output.

In embodiments, bi-grams are used with n=2 where the data item X is broken down into a sequence of sub-strings of length 2 each. Each of those bigrams is then hashed by different hash functions. The number of hash functions is 2, 3 or more and is pre-defined.

In the BF embodiment, a modulus computation (mod N) is then performed on each hash value of each n-gram to map this to one or more bit positions. In the modulo N operation, the remainder value of N, is pre-defined. Preferably N equals the fixed length of the bit pattern BP. Each hash value then corresponds to one or more bit positions. The encoder EC then records a 1-bit for each of the computed bit positions to so derive at a specific bit pattern for X thus implementing the encoding. Each n-gram contributes in general more than one bit position, depending on the number of hash functions used. Preferably more than one hash functions are used. Each bit pattern produced by the encoder may be understood as a digest of the original data item X. It is in particular Bloom filters BF, or more generally binary encoders, that allow efficient processing of data for similarity as will be explained more fully below at FIG. 3. It will be understood that the above described encoding operation is repeated for each data item to be matched across the two data custodians DC1, DC2, each data custodian DC1, DC2 performing the encoding on their respective data items.

The respective bit patterns EC(X)=BP derived this way for the data items X allow defining a suitable similarity measure. Intuitively, the more similar the patterns $E(X')$, $E(X)$ are, the more similar the respective underlying data items inputs $X',X$.

Whilst binary encoders are preferred herein, this is not a requirement herein, so long as all input X is mapped into the same alphabet. Preferably, the lengths of the encoder outputs are constant for all input X. It is preferable for both custodians to use the same alphabet and constant length N to facilitate comparison. Again, the mapping to constant length codes may be ensured by using hash functions but other techniques are also envisaged.

It should be noted that the above described encoding is optional. On occasion the data to be matched is already natively in a format that can be processed herein, or such data may be processed differently to the above described encodings. For example, image data may be available in bit format such as bitmap format, which is another type of binary data envisaged herein. However, non-image data, such as text or numbers or alphanumeric combination, etc, may need to encoded first as described above with a BF or other binary encoder. The terms "filter" and "encoder" are used interchangeably herein.

The manner in which the similarity measure for the encoded data E(X) is computed will now be explained with reference to FIG. 3.

As mentioned earlier, the task of computing the similarity between the encoded data E(X) is preferably, but not necessarily, split between two parties, the linkage unit LU and the decryption unit DU. It is envisaged in embodiments, that each of the at least two computational entities, linkage unit LU and decryption unit DU, compute a certain part of the similarity measure which may then be converted by a computational entity of the system DMS, such as the decryptor DU or linker LU (or one of the custodians, or another entity still), into the similarity measure in full. The similarity results as per the full similarity measure allows ascertaining whether there have been matches across the data items held by the two custodians.

FIG. 3 shows two exemplary encodings $E(X_1)$, $E(X_2)$ of two data items $X_1$ and $X_2$. $X_1$ is a data item held by data custodian DC1, whilst $X_2$ is a data item held by custodian DC2. The two bit patterns $E(X_1)$, $E(X_2)$ can be aligned and compared, because they have the same length N as mentioned above. Specifically, aligning the binary encodings $E(X_1)$, $E(X_2)$ allows finding common bit positions j, where there is an "overlap", that is, where the two encodings each record a 1-bit at the said common bit position j, $E(X_1)_j=E(X_1)_j=1$.

Bit patterns can be viewed as discrete sets, and the common bit positions represent the intersection of those two sets. As has been reported elsewhere by M S H Cruz et al in "*Secure similarity joins using fully homomorphic encryption*", in iiWAS '17: Proceedings of the 19th International Conference on Information Integration and Web-based Applications & Services, December 201, pp 224-233, some similarity measures have been defined in the past to compare to what extent discrete sets are similar. One such similarity measure includes the Tversky index. Other similarity measure examples envisaged herein include the Jaccard Index or Dice coefficient.

In general, similarity measures for discrete sets are functions of the set theoretic union and set theoretic intersection of the two sets to be compared. More particularly, it has been observed that the Tversky Index, but also similar indices, can be written as a function of union set counts UC and intersection counts IC. The counts represent the size of the intersection or union, in other words the number of elements in those two sets. For present purposes, those elements are all 1-bit positions of the two encodings for the union counts, and the common 1-bit positions for the intersection counts.

Indeed, a large family of similarity measures for discrete sets, which me be referred to herein as Jaccard type measures, can be understood as intersections over unions:

$$J(A,B)=\mu|A \cap B|/|A \cup B| \quad (1)$$

with A,B are discrete sets, and |•| the cardinality, with μ a proportionality factor, which may be unity. Jaccard-type measures equal or are proportional to (1). Jaccard type measures J(A,B) are functions of intersection counts (see the numerator in (1)) and union counts (see the denominator in (1)). Quantities that equal, or are proportional to, intersection counts |A∩B| or to |A∪B| union counts may be referred to herein as "partial similarity measures", as opposed to the "full similarity measures" as per (1). Partial measures may be of interest in their own right and are indeed envisaged in embodiments herein as a way to merely "coarsely" quantify data matching results, in particular if only information on negative results are sought. For example, as per (1) a zero intersection count represents a no match result. The partial measures are proportional to the full Jaccard-type measure eq (1). Given the two partial similarity measures, the intersection counts |A∩B| and the union counts |A∪B|, or quantities proportional thereto, a full similarity measure may be converted into, from the intersection counts and union counts as per (1), for instance by forming ratios. Thus in embodiments, the partial similarity measures may be considered as intermediate output pending their conversion into the full measure by using auxiliary data that represents the other partial measure. For instance, the intersection counts may be provided as an intermediate result and this may then be converted into the full measure using the union counts as auxiliary data. The nature of the conversion depends on the measure to be implemented and may require further parameters as auxiliary data.

The Tversky index is one example of (1), and envisaged herein in embodiments. Based on the Tversky index, the Tversky threshold Index measure "TI (•)" can be derived. The Tversky threshold Index measure, but also other types of similarity measures, can be written as a linear combination of the union UC counts and intersection counts IC and $q_1$, $q_2$ of the similarity threshold q. For example, Cruz et al cited above have reported the following finding for binary data:

$$TI^q(A,B)=(q_1+q_2)|A\cap B|-q_2(|A|+|B|) \quad (2)$$

with and $q_1$, $q_2$ of the similarity threshold q.

The Tversky index measure allows similarity matches in binary form. No information on the level of similarity is divulged. In more detail, the Tversky index measure can be positive or negative. A non-negative TI-measure indicates a match with similarity greater than or equal to q %, wherein a negative measure indicates a non-match, as similarity is less than q %. To ensure even better privacy protection, it is in particular the fuzzy data matching based on the TI-measure that is envisaged herein in embodiments. However, matching based on other, more general, measures as per (1) are not excluded herein. As can be seen, in the example of measure (2), the above mentioned conversion from partial to full measures is a linear combination with threshold data (in this case threshold sum and numerator) as further auxiliary data.

As shown in FIG. 3, in embodiments, the proposed similarity matching system DSM is configured so that the linkage unit LU together with the decryption unit DU can process union counts and intersection counts as per (1) into a full similarity measure to yield the similarity results for two groups of data items, one group from data custodian DC1, and the other group from data custodian DC2.

As will be explained in more detail below, computation of the Tversky measure, including the intersection and union counts, can be efficiently implemented by representation of the encoded data items E(X) in matrix structures. This allows the above mentioned SIMD scheme to be used and/or execution can be parallelized to efficiently compute the set theoretic counts, the intersection and/or union required for the similarity measure. A pair-wise comparison is no longer required as the computations can be done group-wise at once for the plurality of data items to be matched.

The proposed system DMS is configured to perform the above described computations of the union and/or intersection counts in an anonymized manner. In other words, the data items themselves are not only encoded, but also encrypted. A homomorphic encryptor ENC is used, preferably with a packing functionality, which is typically based on the Learning-With-Errors (LWE) problem. The encoder EC, even when using bloom filters, does not amount to an encryption. It has been reported that bloom filters can be brute-forced to reveal the underlying data X by frequency and crypto-analysis. The proposed system further includes an encryptor ENC that implements preferably homomorphic encryption.

Homomorphic encryption ("HE") is now explained in FIG. 4 in more detail. Not all encryption schemes are homomorphic. Those that are homomorphic and desirable for use in the proposed system include the Brakerski-Gentry-Vaikuntanathan (BGV) scheme, the Gentry-Sahay-Waters (GSW) scheme and the Brakerski/Fan-Vercauteren (BFV) scheme, although any homomorphic encryption scheme that supports ciphertext packing (in particular for matrix multiplication) may also be used. As shown in the communicative diagram of FIG. 4, a certain data item m is given in plaintext in plain text domain PD. The data item m may be subjected to a certain operation f to obtain (4) a result in plain text f(m) in the plain text domain PD. Operation f may for instance be an arithmetical operation, such as multiplication or addition or a combination of those to form linear combinations, in particular a dot product operation, or a matrix multiplication, etc. "Homomorphic" encryption means that the encryption operation enc(.) respects or supports the plain text operation f. That is, the same result f(m) can be achieved by first encrypting (1) m to obtain ciphertext enc(m) in ciphertext domain CD, applying (2) a corresponding homomorphic operation F there to obtain a result F(enc(f(m))) in ciphertext domain, and to then decrypting (3) that result to recover the earlier plaintext result f(m). The exact nature and functioning of the corresponding ciphertext domain operation F will depend on i) operation f and ii) the particular homomorphic encryption algorithm. For example, as will be explained in more detail, the plaintext operation includes matrix multiplication and the encryption implemented by encryptor ENC is preferably chosen to support this operation f. The above mentioned encryption schemes BGV, GSW, BFV and variants thereof (in particular those that are based on the Learning With Errors (LWE) problem) are suitable to support matrix multiplication, linear combinations etc, and give rise to a suitable counterpart ciphertext domain operator F.

The encryptor ENC as proposed herein is not only configured for homomorphic encryption, but is also configured to perform a packing operation in order to encrypt a whole data structure, including an aggregate of multiple data items, such as matrix or vector, into a single ciphertext. In embodiments, this can be done by the encryptor ENC, or a pre-processing entity, mapping the data structure into polynomials first. More particularly, data items that make up the data structure are embedded into coefficients of said polynomial. The polynomial are then encrypted by encryptor ENC in a suitable HE scheme. The homomorphic operation F is then performed on the encrypted polynomials. Other homomorphic encryption schemes with packing are also envisaged herein in embodiments. Packing techniques exits for both, matrices and vectors.

In the proposed system, the encodings at the respective data custodians are aggregated by respective aggregators AG, AG' into suitable data structures before packing and encryption. More particularly, in embodiments envisaged herein, the encodings, that is the bit patterns, are arranged as rows or columns in a matrix structure to implement the aggregation. Two matrices M1, M2 are thus obtained: one M1 by the first data custodian DC1, and one matrix M2 by the other data custodian DC2. By the above described scheme of packed encryption, the matrices can be mapped into coefficients of respective polynomials, and the respective polynomials can then be encrypted by the HE algorithm into a respective single cipher-text. In other words, the whole aggregate of data items, that is the matrix M1 or M2, becomes a single respective cipher-text {M1}, {M2}. The single matrix ciphertexts facilitates computing in an efficient SIMD scheme similarity measures as described above at FIG. 3.

Preferably, the two matrices M1, M2 into which the encodings from the two custodians are respectively aggregated are transposed relative to each other. In other words, whilst the encodings of the data items at one custodian DC1 are aggregated for example as rows in one of the matrices M1, the encodings of the other custodian are aggregated as columns in the other matrix M2, or vice versa. It is not necessary for the matrices to be square matrices. The dimensions of the matrices may depend on the length of the respective encodings and the number of data items in the two groups to be matched.

Matrix multiplication include dot-products of rows and columns. Because of the encoding into binary bit patterns, the dot product directly yields the intersection counts for each entry in the product matrix M1*M2 by multiplying relatively transposed matrices that include the respective data items from custodians DC1, DC2. Matrix multiplication can be efficiently implemented as a parallelized operation in a SIMD-supporting architecture. The intersection counts can thus be obtained group-wise at once rather than pair-wise sequentially, making the system DMS highly responsive. It will be understood however, that the requirement for the transposed relationship between M1,M2 is at least partly determined by the nature of the encodings and/or by the functional representation (1) of the similarity measures. No such transposed relationship, and/or different matrix manipulations may be called for by functional representations other than (1), and/or encodings other than binary. Because of the homomorphic packing and encryption scheme, the above described intersection count operation by matrix multiplication can be done in ciphertext domain to compute {M1*M2}, which is a single ciphertext for the product matrix M1*M2 which records the intersection counts.

Operation of the fuzzy data matcher system DMS will now be described in yet more detail with reference to the block diagrams of FIGS. 5,6. FIGS. 5,6 are according to one embodiment where the encodings of the data items are aggregated into matrices M1,M2. The block diagram in FIG. 5 mainly relates to operation of linkage unit LU whilst FIG. 6 details operation of the decryption unit. However, two third parties are not necessarily required as will be explained more fully below. The numerical entries in the matrices in FIGS. 5,6 (and FIG. 7) are purely for illustration purposes. In the examples below at FIGS. 5-7, $q_1$=4, $q_2$=5, so threshold q=4/5, and threshold sum $q_1+q_2$=9. In the matrices, "RC" indicates row count, and "CC" column count, with "Cti", i=1, 2 indicating exemplary counts. "Ai" relates to data items of data custodian DC1 and "$B_i$" relates to data items of data custodian DC2. "Biti" is a general reference to a bit entry of an encoding.

Referring now first to FIG. 5, the decryption Unit DU generates a homomorphic encryption key-pair, and shares the public key with the data custodians DC1, DC2. The private key remains with the decryption unit DU.

In embodiments, but not all embodiments, the data items to be matched are pre-processed to facilitate encoding operation by encoder EC. For example, each data custodian DC1, DC2 may break its held data items (such as patient demographics) to be matched into n-grams, such as bi-grams (n=2) which are then hashed by encoder EC into a Record Bloom Filter (RBF) per data item, eg per patient record. In other words, a whole data record per patient may be so hashed. But again, other data items such as individual attributes may be so hashed instead. Reference to RBFs herein is not limiting but serves as an illustration, although such RBFs are still envisaged in embodiments. The per record encodings are not confined to the medical field.

The encodings, such as the said RBFs, are then aggregated by aggregators AG, AG' into respective RBF matrices M1, M2. This aggregation operation may be conceptualized by "stacking" the encoded data items RBF on "top" of each other to generate the respective RBF matrix M1, M2 at each data custodian DC1, DC2.

Two ciphertexts {M1}, {M2$^T$} are then generated by encryptor ENC from the respective RBF matrices of DC1 and DC2: one, eg {M1}, by encryption, the other {M2$^T$} by transposition and encryption. Matrix packing techniques are preferably used to obtain a single ciphertext for each input matrix M1, M2$^T$. It will be understood that no active transposition step is necessarily required as one of the facility DC2 may generate its matrix M2$^T$ in transposed fashion relative to the matrix M1 of the other facility DC1 in the first place. What is assumed herein in embodiments is that both matrices M1, M2$^T$ are generated so that the data items aggregated therein are transposed relative to each other. Whether this is achieved by active transposition or natively is of no relevance herein. In order to not encumber notation, we will drop the "$^T$" with the understanding that M1, M2 are transposed relative each other.

Auxiliary data XD in form of two additional vectors CV1, CV2 (referred to herein as the count vectors) are generated at the respective data custodian DC1, DC2 by respective counting processors CP. Counting processors CP may be efficiently implemented by a series of dot product operations with a unit vector, correspondingly transposed. As a result, each count vector includes in plaintext the sums of 1-bits from each row (for CV1) and each column (for CV2) of the respective RBF matrix M1, M2, the two vectors CV1, CV2 thus inheriting their transposed relationship from their respective matrix M1, M2. We shall also drop the notation "$^T$" herein, it being understood it is also CV1, CV2 that are relatively transposed to each other.

A convertor CONV converts the count vectors CV1, CV2 by scalar multiplication with numerator $q_1$ of the Tversky index threshold q. The converted count vectors CV1$^+$, CV2$^+$ are then encrypted by encryptor ENC into one single ciphertext each, preferably using vector packing techniques. The notation "+" will be used herein to indicate convertor CON operation. The convertor operation may be used multiple times herein, it being understood that this may or may not be the same computational entity.

All the four above described ciphertexts the matrices {M1},{M2} and for the count vectors {CV1},{CV2} of the two custodians DC1,DC2, are then sent to the linker LU where they are received at input interface IN.

Linker LU uses convertor CONV to re-weigh the counts {CV1},{CV2} by multiplication with plaintext scalar $q_1$ or ciphertext scalar $\{q_1\}$. Preferably, plaintext $q_1$ is used as the homomorphic encryption may be assumed to support plaintext multiplication in ciphertext domain. Linker LU selects the corresponding row count $\{CV1\}$ and encrypted RBF matrix $\{M1\}$ from one facility, and the column count $\{CV2\}$ and the relatively transposed and encrypted RBF matrix $\{M2\}$ of the other facility. The two RBF ciphertexts are multiplied by combiner H to generate the multiplied matrix ciphertext $\{M1*M2\}$. This matrix product ciphertext is then converted by multiplication with scalar threshold sum $q_1+q_2$ to obtain converted product $\{(M1*M2)+\}$. The threshold q, and sum $q_1+q_2$, can be published and accessed to implement this conversion or may be provided by custodians DC1, DC2 as part of auxiliary data XD. As a variant, this conversion by threshold sum $q_1+q_2$ multiplication may have been done instead at one of the custodians DC1, DC2, instead of at the linker LU. For example, one of the plaintext input matrices M1, M2 may be multiplied by threshold sum $q_1+q_2$ at the data custodian DC1, DC2.

The converted matrix product ciphertext $\{(M1*M2)+\}$ is then sent to the decryptor unit DU, along with the selected row and column count vector ciphertexts $\{CV1\}$, $\{CV2\}$ as auxiliary data.

Turning now to the operation of the decryption unit DU at FIG. 6, the decryption unit DU decrypts the received three ciphertexts $\{(M1*M2)+\},\{CV1\},\{CV2\}$ based on the retained private key associated with the public key. Decryption unit DU operates in plaintext domain, as opposed to linker LU that was operating in ciphertext domain.

By expanding the row count vector CV1, a row count matrix CM1 is generated (with same dimensions as the multiplied matrix M1*M2) by making each element a row in the row matrix. Similarly, based on the column count vector CV2, a column matrix CM2 is generated by making each element a column in the column matrix. Again, the dimension of CM2 is as that of M1*M2. This dimension information is available because of the plaintext data. It will be understood that despite DU operating in plaintext, no data is actually revealed as the data items versus rows/column correspondence is only known to data custodians DC1, D2, respectively.

A convertor CONV' of decryption unit DU then subtracts the generated row and column count matrices CM1,CM2 from the multiplied matrix M1*M2 to generate the plaintext result matrix SR. The result matrix SR, or relevant entries in the result matrix, may be forwarded to one or both custodians DC1, DC2 for evaluation.

The result matrix SR may record the similarity measures within threshold q. In other words, an entry in the result matrix may indicate a match score higher than threshold q %. For instance, q=80%. In bloom filters, or other PDS encodings, non-negative (>=0) entries represent a match score higher than threshold q %. However, a negative entry (<0) indicates similarity score less than q %, which is a non-match.

As will be apparent from the explanations in FIGS. 5, 6, the proposed system is not necessarily tied to aggregation into 2D matrices. Other, similar data structures that allow efficient processing, in particular parallelized processing, are also envisaged herein in embodiments, such as higher than two-dimensional matrices, "tensors", and others. Data structures other than matrical altogether may also be envisaged in other embodiments.

Whilst the above described embodiments have been based on data custodians supported by two third parties, namely the linkage unit LU and the decryption unit DU, this is not necessarily the case for all embodiments. For instance, in one alternative embodiment the functionalities of the linkage unit LU and the decryption unit DU is integrated into one single combo-processing entity LU', so only one third party is required. However, the proposed scheme can also be practiced with benefit without any third party altogether, and the functionalities of the decryption unit and linkage unit are wholly performed by one of the data custodians themselves.

In more detail, in the embodiment with a single-third party LU' (not shown), the two custodians DC1, DC2 forward four items of ciphertexts to linker LU': the two encrypted input matrices $\{M1\}$, $\{M2\}$ that represent, as in FIGS. 5,6, the intersection counts, relatively transposed to each other, and the two row and column count matrices $\{CM1^+\}\{CM2^{+'}\}$, converted by multiplication with $q_1$, and also relatively transposed to each other. The linker LU' combiner H and the converter CONV' operate in ciphertext-domain to combine $\{M1\}$, $\{M2\}$ into the matrix product multiplied with threshold sum $q_1+q_2$ to yield $\{(M1*M2)+\}$. The convertor then subtracts both of $\{CM1^+\}$, $\{CM2^+\}$ from $\{(M1*M2)^+\}$ to yield the match result matrix $\{SR\}$ which can be forwarded to one or both custodians DC1, DC2 for decryption and evaluation.

In the embodiment with no third party (not shown), the computations are performed peer-to-peer by one of the custodians DC2, after receipt of encrypted ciphertext data including $\{M1\}$ and $\{CM1^+\}$ from other custodian DC1. In order to be able to operate on this data in chipertext domain, custodian DC2 encrypts and converts its own data to obtain counts $\{CM2^{+'}\}$ and $\{M2\}$. The receiving peer DC2 then performs the operation as described in the previous paragraph above for linker LU. A copy of the result matrix $\{SR\}$ is then passed back to custodian DC1 where in is decrypted and evaluated. Note that custodian DC2 may not decrypt the results $\{SR\}$, as it is assumed in this case that DC1 generates the encryption key, and is the only party capable of decrypting $\{SR\}$.

Figure 7:
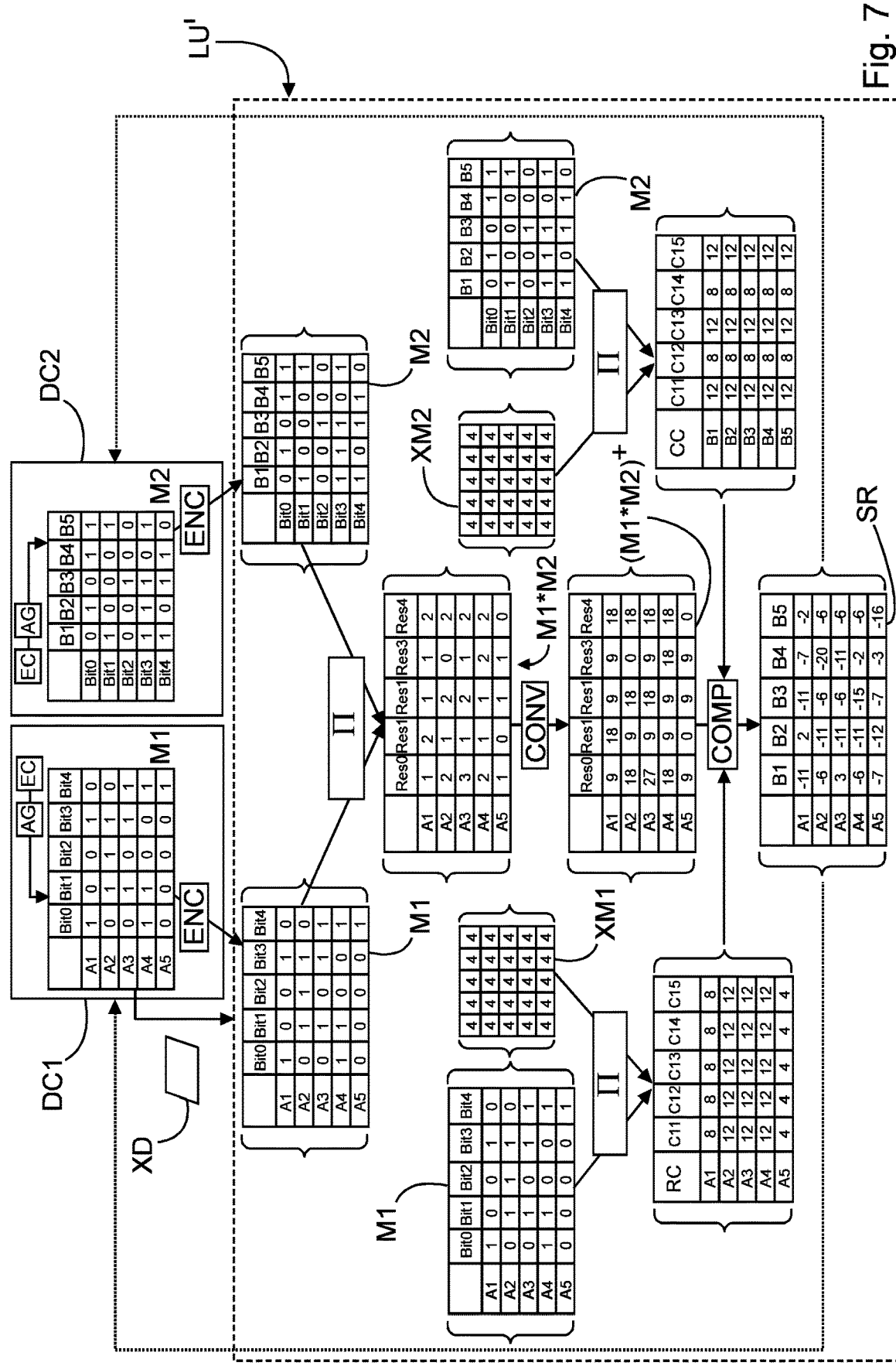
FIG. 7 illustrates a block diagram of a communication network with data memory nodes according to a second embodiment.

In embodiments, especially in FIGS. 5 and 6, when implemented as shown with two third parties, a single third party, or no third party, the intersection counts IC and union counts UC have been separately encoded into vectors as auxiliary count data XD=CV1, CV2 produced by respective counter modules CP. A more unified system architecture is also envisaged where all pertinent operations can be performed by matrix operations without such count auxiliary data XD. Specifically, it is no longer necessary to explicitly provide the count data CV1, CV2 as above in the embodiments of FIGS. 5,6. One such embodiment for this unified system architecture is shown in FIG. 7. In the FIG. 7 embodiment, merely the dimensions (eg n-by-m and m-by-l) of the two matrices M1, M2 are provided, without count vectors CV1, CV2, or dimensions may be published.

In this embodiment, as before in FIGS. 5,6, the two matrices M1, M2, with encodings aggregated therein, and with one matrix M1 transposed relative to the other M2, are forwarded in ciphertext to combo entity LU' that consolidates some or all functions of the linker LU and decryptor DU. However, the embodiment in FIG. 7 may also be practiced in two-third-party form, with linker LU and decryptor DU separate entities in communication, or indeed in the 0-third party embodiment.

The following operations are performed in ciphertext domain by combo entity LU':

The two single ciphertexts $\{M1\}$ and $\{M2\}$ are combined by combiner H into the single third cipher-text $\{M1*M2\}$ that represents matrix product M1*M2. And hence the intersection counts. In this embodiment, in addition to the two matrix ciphertexts $\{M1\}$, $\{M2\}$, it is only required to include as auxiliary information merely the dimensions of the matrices M1, M2 in plaintext.

As before, the threshold numerator and denominator may also be sent by data custodians DC1 or DC2 to linker LU, in plaintext or ciphertext. Alternatively, the threshold numerator and denominator are published and may be requested by linker combo-LU'. With this threshold information, the similarity match can be performed entirely based on matrix multiplication as shown in FIG. 7. In particular, convertor CONV multiplies, in the ciphertext domain, matrix multiplication ciphertext {M1*M2} with the threshold sum, that is, the sum of numerator $q_1$ and denominator $q_2$ of threshold q. The result is a converted matrix product {(M1*M2)+}.

In FIGS. 5-7, the operation of the converter CONV is in general a function of the similarity measure one wishes to implement. In embodiments envisaged herein convertor CONV implements a similarity as per eq (1),(2). The operation of convertor CONV is in embodiments one of forming a linear combination by i) reweighting based on threshold q and ii) by subtraction, but this the convertor operation may differ for similarity measures other than of type eq (2).

Two auxiliary matrices {MX1}, {MX2} are generated by linker LU' based on the dimensions of the input matrices M1, M2 as included in the auxiliary information received from one of the data custodian DC1, DC2 or as published. The auxiliary matrices {XM1}, {XM2} are generated as respective unity matrices and are then multiplied with the threshold numerator $q_1$. {MX1}, {MX2} are transposed relative to each other, in correspondence to the input matrices M1, M2 being transposed relative to each other.

Ciphertext matrices {M1}, {M2} are then respectively multiplied by combiner H with the correspondingly transposed auxiliary matrices {XM1}, {XM2}, to obtain two additional matrices {M1*MX1}, {M2*MX2}. It may be noted that, as indicated above, whilst no count data CV1, CV2 need be provided herein by the custodians, the said count data is instead now computed "internally" by the combo unit LU'. The internal computation of the counts is implemented by the multiplications {M1*MX1}, {M2*MX2}. In other words, the union count matrices previously generated by the decryptor DU at FIGS. 5,6 are now computed internally at the combo unit LU' as ciphertexts.

Convertor CONV composes the ciphertext result matrix {SR} from the said two additional matrices {M1*MX1}, {M2*MX2} and the augmented ciphertext {(M1*M2)+} of the multiplied matrices M1, M2. The result matrix {SR} includes the similarity results in ciphertext. Specifically, and according to one embodiment as per the structure eq (2) of the similarity measure TI(•), the two additional matrices are subtracted by convertor CONV from {M1*M2} to obtain the result matrix in ciphertext {SR}. The result matrix includes as entries the data items match results, with rows and columns corresponding to the data times of one of data custodian DC1, and the other DC2, respectively. The ciphertext {SR} result matrix may then be forwarded to custodian DC1 or DC2 for decryption, or to any other party that holds the private encryption keys associated for the public key used for encryption.

It will be understood from the above that the matrix multiplication operations in FIGS. 5-7, with one input matrix M1 being the transpose relative to the other matrix M2, constitutes an efficient instruction for computing the partial similarity measure, specifically the intersection count data, as observed earlier in connection with FIG. 3 and eqs (1),(2). Thus, the matrix operation M1*M2 represents intersection count IC. What Applicant has discovered herein is that the "mechanics" of matrix multiplication can be usefully leveraged to carry into effect an efficient implementation of computing in particular the intersection counts IC. The auxiliary vectors or matrices as employed above constitute a representation of the union counts UC. The convertor CONV processes the union counts and the intersection counts by subtraction as per eq (2) above. The row/column counts as used for example in embodiments FIGS. 5,6 and as output by counter CP may be implemented by dot product multiplication with a vector having all entries unity.

It should be noted however, that for any of the above described embodiments in FIGS. 5-7, the precise operational nature of the convertor CONV may not necessarily be a subtraction, as the exact configuration of the convertor operation may be prescribed by the functional expression of the similarity measure one wishes to compute, which may well differ from the embodiment as per Eq (2).

Whilst FIG. 7 has been described in terms of a single third party, the combo entity LU', this embodiment can also be practiced with two third parties, the linker LU and the decryptor DU as in FIGS. 5,6, or with no third party peer-to-peer by one of the custodians DC2. In embodiments where no third parties are envolved, the cryptographic keys may be generated by one of the custodians, eg DC1, if the other custodian, eg DC2, is to perform the similarity computations. In embodiments with two third parties, the decryptor DU may generate the keys, and makes the results SR available in plaintext. In both embodiments, no count data is necessary, and only matrix-dimensional information is required.

The system in FIGS. 1,5-7 allow achieving reduced communication overhead, due to the use of up to four ciphertexts, instead of 2N ciphertexts, and generates a single ciphertext {SR} as the result, instead of $N^2$ ciphertext results. The matrix multiplication to obtain M1*M2 is computationally more efficient than pairwise multiplication of encrypted encodings (such as Bloom filters).

Preferably the main memory of the computational entity (such as the linker LU,LU' or one of the custodians Dc1, DC2) that performs the matrix multiplication(s), is so configured that the input matrices, for example M1,M2, can be loaded each as a whole into the main memory. Alternatively, the matrix M1,M2 may be split into smaller matrices, each multiplied with one another, such that each of the smaller matrices can be loaded as a whole into main memory. This will still allow faster than pairwise comparison.

In the embodiments above, the auxiliary data, that count vectors or matrices, can be forwarded to third party or other data custodian packed (if non scalar) and encrypted. The auxiliary data may include the matrix dimension information, or this may be sent in plaintext.

The proposed scheme described herein assumes that the linkage unit LU,LU' and decryption unit DU are honest but curious and do not collude with each other.

Figure 8:
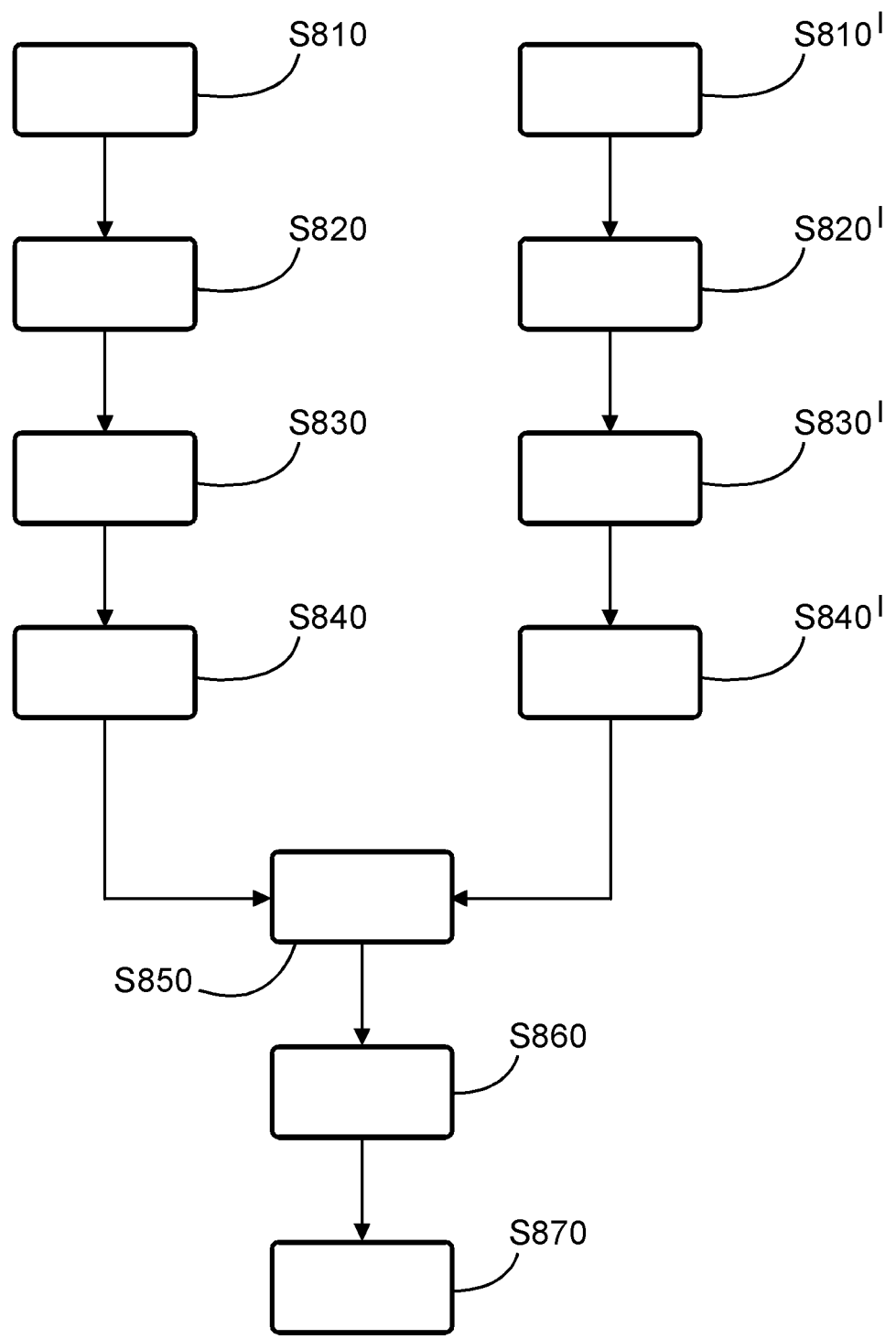
FIG. 8 illustrates a flow chart for a method of anonymised fuzzy data matching.

Reference is now made to FIG. 8 which shows a flow chart of a method of anonymised data matching across data memories in a network. The data matching is fuzzy in that only similarity within a threshold q is sought. Identical match is not required herein, but may still be done by choosing q=1 for example.

The top part of FIG. 8 shows two strands, the left strand representing respective steps to be performed by one of the custodians DC1, and counterpart steps performed by the other data custodian DC2 shown as the right strand.

At steps S810, S810' data items to be matched are accessed at the respective custodians. Preferably, each data custodian DC1, DC2 accesses in steps S810 and S810' plural of its data items to be matched to so define two groups of data items, one group held by data custodian DC1, the other group by data custodian DC2.

At step S820, S820, the data items are encoded preferably into binary form to obtain two groups of respective encodings for and at the two sites DC1, DC2. The steps S810, S810' are optional, in case the data already is in a suitable format such as binary format.

In step S830, S830' the encodings of the data items are respectively aggregated into a respective aggregated data structure, such a respective matrix. The two matrices are preferably transposed relative to each other. In other words, whilst in one data custodian the encodings are arranged in rows, the encodings of data items of the other custodian are arranged in columns or vice versa. It is preferable that this step is co-ordinated and that the parties agree who is to aggregate into rows and who aggregates into columns. A communication protocol may be set up to implement this co-ordination.

At steps S840, S840', the respective matrices are packed and encrypted to derive respectively a single cipher-text for the two matrices at the two data custodians DC1 and DC2. As the matrices are relatively transposed, one of the matrices is inverted first and then packed, whilst the other can be packed without inversion. The two matrix ciphertexts are then forwarded to a third party but this may not be the case in all embodiments, as the further processing steps can be conducted at either one of the custodians, peer-to-peer.

At step S850 the matrix ciphertexts are processed into a third single ciphertext. That single third ciphertext represents a combination of the two aggregates. In one embodiment, the single ciphertext represents the ciphertext of a multiplication of the two input matrices generated at steps S830, S840. Step S850 represents the computation of the intersection counts. The multiplication is supported in ciphertext domain by the homomorphic encryption (HE) as applied at steps S840,S840'. The HE supports matrix multiplication and/or dot products.

At step S860, the third ciphertext of the matrix multiplication is decrypted to reveal a data structure that represents partial similarity measures for the data items matches. In particular, the partial similarity measures may be intersection counts or quantities proportional thereto.

In an optional step S870, the intersection counts as per the decrypted matrix multiplication as revealed in step S860 is converted, based on auxiliary information, into a plain text representation of the full similarity measures for some or each data item of one custodian versus some or each data items of the other custodian. The auxiliary information may include in particular the union counts for the bits in the encodings. In embodiments the similarity measures (or scores) are binary and merely represent whether or not for a given pair of data items, there has been a match recorded. In embodiments, the conversion S870 may be done in ciphertext domain and the decryption step S860 is applied after the conversion S870 to then yield the full similarity measures in plaintext rather than the plaintext partial similarity measure. In other words, in embodiments the method may operate wholly in ciphertext domain.

The method may be practiced wholly or in parts by a single or two third parties receiving encrypted input and auxiliary data from the custodians. Alternatively, the method is practiced peer-to-peer by one of the custodians.

Preferably the similarity scores are made available in a matrix structure inherited from the previous steps so that an entry (i,j) represents the similarity results for data item i from one data custodian, versus data item j from the other data custodian. However, representation of the similarity match results in such matrix structure is not mandatory, and may be provided in other forms.

The similarity match results can then be made available to either one or both of the data custodians, or may be made available to other interested parties as per protocol. As will be understood, a reference herein to "match results" is generic and includes results that indicate that two data items do not match.

It should be noted that embodiments of the invention are described with reference to different subject matters. In particular, some embodiments are described with reference to method type claims whereas other embodiments are described with reference to the device type claims. However, a person skilled in the art will gather from the above description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and limiting. The invention is not limited to the disclosed embodiments. Other variations of the disclosed embodiments can be understood and effected by those skilled in the art in practicing the claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims, be they numerical, alphanumerical, or a combination of one or more letters, should not be construed as limiting the scope.

The invention claimed is:

1. A computer-implemented cryptographic method for facilitating a data similarity query across a network of data memories, the method comprising:

receiving, from a first memory in the network, a first ciphertext for a first aggregation of first encodings of data items of a first group, the first group of data items being of a first party;

receiving, from a second memory in the network, a second ciphertext for a second aggregation of at least one second encoding of at least one data item of a second group, the second group of data items being of a second party; and processing the first and second ciphertexts into a third ciphertext, the third ciphertext decryptable into plaintext output, wherein the plaintext output is associable with similarity measures between data items from the two groups, wherein the similarity measures establish a similarity between the data items of the first group and the at least one data item of the second group as held in the data memories, wherein the first encodings and the at least one second encoding are, by representation, in a respective hash-based probabilistic data structure, PDS, the first and second aggregations previously obtained by forming respective matrices from the said first encodings and the at least one second encoding, the first ciphertext previously obtained through homomorphic encryption of the first aggregation of the first encodings, the second ciphertext previously obtained through homomorphic encryption of the second aggregation of the second encoding, and further wherein the processing of the first and the second ciphertexts includes a matrix multiplication of the at least two matrices.

2. The method of claim 1, wherein the first encodings and/or the second encoding are binary encodings.

3. The method of claim 1, comprising decrypting the third ciphertext into the plaintext output.

4. The method of claim 1, wherein the plaintext output represents a partial similarity measure that is convertible into the similarity measures, and/or wherein the similarity measures, or the partial similarity measure, is based on any one of, but is not limited to: Dice coefficient measure, Tversky coefficient measure, Jaccard coefficient measure.

5. The method of claim 1, comprising converting the plaintext output into the similarity measures.

6. The method of claim 1, wherein the first and second encoding is configured to allow querying whether one or more data items of one of the groups is similar to one or more data items of the at least one other group.

7. The method of claim 1, wherein the first encodings and the at least one second encoding includes a respective Bloom Filter.

8. The method of claim 1, wherein at least the matrix multiplication of the at least two matrices is implemented in a parallelized manner.

9. A method for facilitating a data similarity query across a network of data memories including a first memory and a second memory, the method comprising:

forming i) a first aggregation from first encodings of data items of a first group in the first memory, and ii) a second aggregation from at least one second encoding of at least one data item of a second group in the second memory, the first group of data items being of a first party, the second group of data items being of a second party; and homomorphically encrypting the two aggregations into two ciphertexts including a first ciphertext and a second ciphertext, wherein the first encodings and the at least one second encoding are, by representation, in a respective hash-based probabilistic data structure, PDS, wherein the forming of the first and second aggregations includes forming a respective matrix from the said first encodings and the at least one second encoding, wherein the first ciphertext obtained through homomorphic encryption of the first aggregation of the first encodings, the second ciphertext obtained through homomorphic encryption of the second aggregation of the second encoding, wherein the first and second ciphertexts processable into a third ciphertext including matrix multiplication of the at least two matrices, wherein the third ciphertext is decryptable into plaintext output, wherein the plaintext output is associable with similarity measures between data items from the two groups, and wherein the similarity measures establish a similarity between the data items of the first group and the at least one data item of the second group as held in the data memories.

10. A method for facilitating a data similarity query across a network of data memories that includes a first memory and a second memory, the method comprising:

decrypting a third ciphertext, previously obtained by processing first and second ciphertexts, into plaintext output convertible into similarity measures for data items across a plurality of groups that includes a first group and a second group, the first ciphertext previously obtained through homomorphic encryption of a first aggregation of first encodings of data items of the first group in the first memory, the first group of data items being of a first party, and the second ciphertext previously obtained through homomorphic encryption of a second aggregation of a second encoding of at least one data item of the second group in the second memory, the second group of data items being of a second party, wherein the first and second encodings are, by representation, in a respective hash-based probabilistic data structure, PDS, the first and second aggregations previously obtained by forming a respective matrix from the said first encodings and the at least one second encoding, and wherein the said previous processing of the first and second ciphertexts into the third ciphertext includes matrix multiplication of the at least two matrices and wherein the similarity measures establish a similarity between the data items of the first group and the at least one data item of the second group as held in the data memories.

11. A non-transitory computer readable storage medium comprising instructions that when executed on at least one processor of at least one computer, causes the at least one computer to perform the steps of:

receive, from a first memory in a network, a first ciphertext for a first aggregation of first encodings of data items of a first group, the first group of data items being of a first party;

receive from a second memory in the network, a second ciphertext for a second aggregation of at least one second encoding of at least one data item of a second group, the second group of data items being of a second party;

process the first and second ciphertexts into a third ciphertext, the third ciphertext decryptable into plaintext output, wherein the plaintext output is associable with similarity measures between data items from the two groups, wherein the similarity measures establish a similarity between the data items of the first group held in the first memory and the at least one data item of the second group as held in the second memory;

wherein the first encodings and the at least one second encoding are, by representation, in a respective hash-based probabilistic data structure, PDS, the first and second aggregations previously obtained by forming respective matrices from the said first encodings and the at least one second encoding, the first ciphertext previously obtained through homomorphic encryption of the first aggregation of the first encodings, the second ciphertext previously obtained through homomorphic encryption of the second aggregation of the second encoding, and further wherein the processing of the first and the second ciphertexts includes a matrix multiplication of the at least two matrices.

12. A system for facilitating a data similarity query across a network of data memories that include a first memory and a second memory, comprising at least one processor and associated memory storing instructions configured to:
  receive, from the first memory in the network, a first ciphertext for a first aggregation of first encodings of data items of a first group, the first group of data items being of a first party;
  receive, from the second memory in the network, a second ciphertext for a second aggregation of at least one second encoding of at least one data item of a second group, the second group of data items being of a second party; and
  process the first and second ciphertexts into a third ciphertext, the third ciphertext decryptable into plaintext output, wherein the plaintext output is associable with similarity measures between the data items from the two groups, wherein the similarity measures establish a similarity between the data items of the first group and the at least one data item of the second group as held in the data memories,
    wherein the first encodings and the at least one second encoding are, by representation, in a respective hash-based probabilistic data structure, PDS,
    the first and second aggregations previously obtained by forming a respective matrix from the first encodings and the at least one second encoding,
    the first ciphertext previously obtained through homomorphic encryption of the first aggregation of the first encodings, the second ciphertext previously obtained through homomorphic encryption of the second aggregation of the second encoding,
    wherein the processing by the system of the first and second ciphertexts into the third ciphertext includes matrix multiplication of the at least two matrices.

13. A system for facilitating a data similarity query across a network of data memories that includes a first memory and a second memory, the system comprising at least one processor and associated memory storing instructions configured to:
  form i) a first aggregation from first encodings of data items of a first group in the first memory, and ii) a second aggregation from at least one second encoding of at least one data item of a second group in the second memory; and to
  homomorphically encrypt the two aggregations into two ciphertexts including a first ciphertext and a second ciphertext,
    wherein the first encodings and the at least one second encoding are, by representation, in a respective hash-based probabilistic data structure, PDS,
    the first and second aggregations previously obtained by forming a respective matrix from the said first encodings and the at least one second encoding,
    the first ciphertext obtained through homomorphic encryption of the first aggregation of the first encodings, the second ciphertext obtained through homomorphic encryption of the second aggregation of the second encoding,
    the first and second ciphertexts processable into a third ciphertext including matrix multiplication of the at least two matrices, wherein the third ciphertext is decryptable into plaintext output, wherein the plaintext output is associable with similarity measures between the data items from the two groups, and
    wherein the similarity measures establish a similarity between data items of the first group and the at least one data item of the second group as held in the data memories.

14. A system for facilitating a data similarity query across a network of data memories that includes a first memory and a second memory, the system comprising at least one processor and associated memory storing instructions configured to:
  decrypt a third ciphertext, previously obtained by processing first and second ciphertexts, into plaintext output convertible into similarity measures for the data items across the groups, the first ciphertext previously obtained through homomorphic encryption of a first aggregation of first encodings of data items of a first group in the first memory, and the second ciphertext previously obtained through homomorphic encryption of a second aggregation of a second encoding of at least one data item of a second group in the second memory, the first group of data items being of the first group, the second group of data items being of the second group,
    wherein the similarity measures establishing a similarity between the data items of the first group and the data items of the second group as held in the data memories,
    wherein the first encodings and the second encoding are, by representation, in a respective hash-based probabilistic data structure, PDS,
    the first and second aggregations previously obtained by forming a respective matrix from the first encodings and the second encoding, and
    wherein the said previous processing of the first and second ciphertexts into the third ciphertext includes matrix multiplication of the at least two matrices.

15. A non-transitory computer readable storage medium comprising instructions that when executed on at least one processor of at least one computer, causes the at least one computer to perform the steps of:
  forming i) a first aggregation from first encodings of data items of a first group in a first memory, and ii) a second aggregation from at least one second encoding of at least one data item of a second group in a second memory, the first group of data items being of a first party, the second group of data items being of a second party; and
  homomorphically encrypting the two aggregations into two ciphertexts including a first ciphertext and a second ciphertext,
    wherein the first encodings and the at least one second encoding are, by representation, a respective hash-based probabilistic data structure, PDS,
    wherein the forming of the first and second aggregations includes forming a respective matrix from the said first encodings and the at least one second encoding,
    the first ciphertext obtained through homomorphic encryption of the first aggregation of the first encodings, the second ciphertext obtained through homomorphic encryption of the second aggregation of the second encoding,
    the first and second ciphertexts processable into a third ciphertext including matrix multiplication of the at least two matrices, wherein the third ciphertext is decryptable into plaintext output, wherein the plaintext output is associable with similarity measures between data items from the two groups, and wherein the similarity measures establish a similarity between the data items of the first group and the at least one data item of the second group as held in the data memories.

16. A non-transitory computer readable storage medium comprising instructions that when executed on at least one processor of at least one computer, causes the at least one computer to perform the steps of:

decrypting a third ciphertext, previously obtained by processing first and second ciphertexts, into plaintext output convertible into similarity measures for data items across a plurality of groups that includes a first group and a second group, the first ciphertext previously obtained through homomorphic encryption of a first aggregation of first encodings of data items of the first group in a first memory, the first group of data items being of a first party, and the second ciphertext previously obtained through homomorphic encryption of a second aggregation of a second encoding of at least one data item of the second group in a second memory, the second group of data items being of a second party, wherein the first and second encodings are, by representation, in a respective hash-based probabilistic data structure, PDS, the first and second aggregations previously obtained by forming a respective matrix from the said first encodings and the at least one second encoding, and wherein the said previous processing of the first and second ciphertexts into the third ciphertext includes matrix multiplication of the at least two matrices, and wherein the similarity measures establish a similarity between the data items of the first group and the at least one data item of the second group as held in the data memories.

* * * * *